Nov. 22, 1955.  G. M. WILLIAMS  2,724,675
LAMINATED WOOD AND METHOD OF MAKING SAME
Filed Nov. 30, 1951
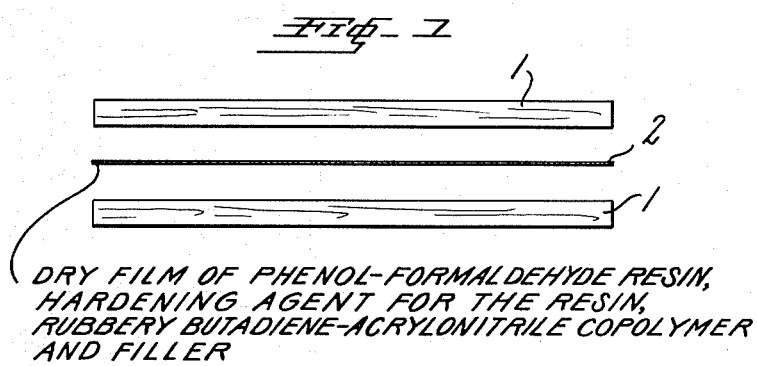
DRY FILM OF PHENOL-FORMALDEHYDE RESIN, HARDENING AGENT FOR THE RESIN, RUBBERY BUTADIENE-ACRYLONITRILE COPOLYMER AND FILLER
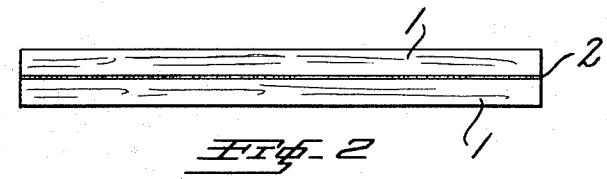
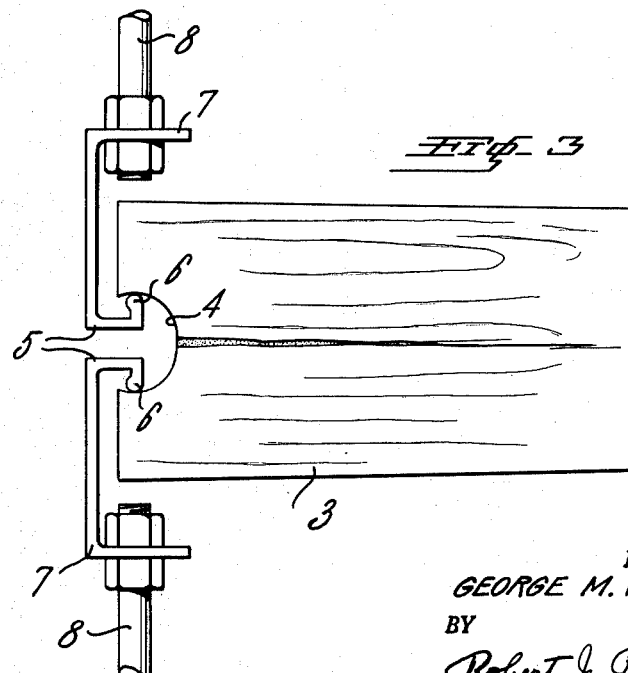
INVENTOR.
GEORGE M. WILLIAMS
BY
Robert J. Patterson
ATTORNEY

United States Patent Office 2,724,675
Patented Nov. 22, 1955

2,724,675

LAMINATED WOOD AND METHOD OF MAKING SAME

George M. Williams, New Haven, Ind., assignor to United States Rubber Company, New York, N. Y., a corporation of New Jersey Application November 30, 1951, Serial No. 259,115

4 Claims. (Cl. 154—133)

This invention relates to the lamination of wood and more particularly to the lamination of sheets of wood veneer with a unique bonding material more fully disclosed hereinafter, so as to form plywood and similar laminated wood structures.

Layers of wood have heretofore been assembled into laminated articles such as plywood or the like by the use of many different types of adhesives. Formerly liquid or paste adhesives made with a volatile organic solvent or water as a thinner or diluent to enable spreading and formation of a continuous film were employed to form the bond, the organic solvent or water being removed by evaporation or migration or both after the wood layers have been plied-up with the fluid adhesive therebetween. More recently, there has been adopted the practice of coating or impregnating sheets of light-weight tissue paper with the liquid or paste adhesive, drying and using the dried sheet to form the bond.

Generally speaking, the previously available methods of laminating layers of wood have been subject to various disadvantages and there has not been available to the art a completely satisfactory method of laminating wood. The objections to prior technique relate ot the processing aspects or to the properties of the laminated product and in many cases to both. For example, the use of solvent- or water-based adhesives is highly objectionable because of the cost, toxicity and inflammable nature of volatile solvents, because of the necessity of removing the solvent or water to form the bond, and because of the difficulty of manipulating and handling liquid or paste cements, which in commercial production necessitate the employment of special machinery for spreading. Furthermore, most of the practical liquid or paste adhesives used for laminating wood at the present time require refrigeration for adequate storage or shelf life since otherwise they rapidly deteriorate with loss of strength. In addition, solvent- and water-based adhesives are objectionable because the solvent or water penetrates deeply into the wood carrying the resin into the wood to such an extent as to give a brittle structure, it having been found that impregnation of the wood causes embrittlement. An ideal adhesive is one which firmly attaches itself to the surface of the wood but does not surround the individual wood fibers. Penetration of the wood structure by solvent or water containing adhesive results in such surrounding of the wood fibers.

The use of sheets of paper coated or impregnated with adhesive is objectionable for many reasons among which is the fact that such sheets are extremely brittle and fragile so that they break up easily during handling with the result that assembly is interfered with. Also such sheets are costly to manufacture. Furthermore the paper base of such sheets appears in the final laminate and represents an element of potential weakness therein. Another disadvantage of the paper-based sheets is that they are not stretchable so that they do not lend themselves to use in making articles having compound curves but are useable only in making flat articles or articles having simple curves.

It has also been proposed to use sheets of resins, e. g., unpolymerized phenol-formaldehyde resins, of paper thickness. However, these sheets are fragile and inelastic and moreover show a marked tendency to "pre-set." It is necessary to store these sheets in a cool place in order to prevent them from "pre-setting" or "pre-curing." This is troublesome and expensive. Also the manufacture of paper-thin sheets of uncured phenolic resin sheets is difficult and costly. Under cool storage conditions (below 40° F.) these sheets have a safe working life of only about six months. Furthermore, these sheets are not readily adapted to use in making compound curves.

A further disadvantage of all prior art practice in wood laminating is that it has always been considered necessary to use an odd number of layers of wood disposed with the grain at right angles and that the adhesive layer or layers did not serve as effective strength-imparting structural elements in the product.

The principal object of the present invention is to provide a method of laminating wood and a laminated product which overcome the objections mentioned above. Another object of the invention is to provide a method of laminating wood and a laminated wood product which present all-around superiority over previously available methods and products and which are particularly superior with respect to convenience, economy and cleanliness during manufacture and with respect to properties of the laminate. Another object is to obviate the disadvantages attendant upon the use of adhesives which are based upon a liquid such as a volatile organic solvent or water. Another object is to provide an adhesive which is easy to handle and which is stretchable so that articles having compound curves can be easily made therewith. Another object is to provide an adhesive which is clean with respect to both the workmen and the surroundings in contradistinction to the "messy" nature of liquid or paste adhesives. Numerous other objects of the present invention will more fully hereinafter appear.

In the accompanying drawing:

Fig. 1 portrays two layers of wood and a layer of the adhesive of the present invention, which are to be assembled into a laminated article.

Fig. 2 portrays the laminated article resulting from curing an assembly of the elements shown in Fig. 1 under heat and pressure.

Fig. 3 shows in elevation the apparatus used in making the "cleavage" tests reported in the example below.

I have discovered that layers of wood, such as sheets of wood veneer, can be bonded together in an unusually advantageous manner by plying up a plurality of layers thereof with a solvent-free film of a particular mixture of resin, rubber and filler between each pair of adjacent wood faces and then subjecting the assembly to heat and pressure to cure the film.

More particularly, I take a plurality of layers of wood and place between each pair of adjacent wood faces a dry, i. e., solvent-free, film or sheet of an uncured mixture of a phenol-formaldehyde resin which is capable of being converted to insoluble, infusible form under the action of heat and a methylene-yielding hardening agent, a methylene-yielding hardening agent for the resin, a rubbery butadiene-acrylonitrile copolymer which is compatible with the resin, and a filler. I find that the bond obtained between the wood layers by proceeding in this manner is unusually strong, being stronger than the wood which is joined. The bond is so strong that it makes feasible the production of laminates with the grain of all plies disposed parallel. Thus, when a wood laminate made in accordance with the present invention, with the grain in all of the layers disposed in one direction, is subjected to a force which separates the wood along the line of the grain, the adhesive layer not only remains unbroken but it will actually pull the split wood back together after the splitting force is removed so that the article can be continued in use.

It was surprising to find that layers of wood could be successfully bonded by interposing between the adjacent wood layers a dry film composed of the mixture described herein. The bond obtained between the film of the present invention and the faces of the wood is extremely strong, so strong in fact that fracture of the wood itself will occur before the bond breaks.

The several wood layers can be arranged with the grain of alternate layers at an angle to one another, for example at right angles, as is conventional in wood lamination. However, the present invention makes it not only possible but commercially practicable for the wood laminator to assemble the wod layers with the grain of all layers parallel or running in the same direction. As a result, by means of the present invention, I can ply-up either an odd or an even number of plies at will. This is due to the fact that the bonding layer used in my invention is so strong that it actually serves as an important structural element of the finished assembly. In the prior art practice, it was deemed necessary to use an odd number of plies so that the outside layers would have their grain running in the same direction and so that the effect of cross-grained disposition of plies would be neutralized. The adhesive layer of my invention serves as a neutral ply making it perfectly feasible to produce a plywood having only two layers of wood disposed with the grain parallel. This was totally impracticable with prior art practices.

The ability to bond layers of wood with the grain of all plies running in the same direction is extremely advantageous, particularly in wooden articles in which the edges of a cross-grained wood laminate would be unsightly if exposed to view. It has heretofore been necessary to adhere a face-grain veneer over the exposed edge of the cross-grained laminate. However, such practice is unnecessary when the present invention is used for bonding the layers of wood with their grain parallel.

In practicing my invention I do not employ a solvent for the rubbery copolymer nor for that matter do I employ a solvent for the resin content of the film. The fact that I do not employ an organic solvent in the preparation of the film to be used in the adhesive bond is important because I have repeatedly observed that the use of an organic solvent in the preparation of organic cement-type adhesives, particularly those containing rubber and rubbery materials, is disadvantageous. Even if it were attempted to remove an organic solvent used to effect dissolution and thereby impart mobility during the preparation of the adhesive film, it would not prove possible to completely remove this solvent. Consequently traces of the solvent would remain to cause penetration into the surfaces of the wood. Moreover, I have found that if a cement be made from the several ingredients used in making the film of the present invention, by dissolving the rubbery copolymer and the resin in a volatile organic solvent such as one of the type commonly used for making rubber cement, and used to bond wood layers by coating with the cement and curing under heat and pressure, the physical properties of the resulting laminate are markedly inferior to those obtained when a dry film of the same ingredients is formed, as by sheeting on a calender, without the use of the organic solvent. It will be seen that I dispense with the use of a solvent for either the resin or the rubbery copolymer used in the practice of my invention and that I use a rubbery butadiene-acrylonitrile copolymer which has never been dissolved in a solvent. Elimination of the use of a solvent has further advantages including lower cost of manufacture and freedom from toxicity and fire hazard incident to the use of a volatile organic solvent.

In accordance with my invention, I first prepare a dry film of an uncured mixture of the resin, hardening agent, rubbery butadiene-acrylonitrile copolymer and filler. I typically accomplish this by first blending these ingredients together in any suitable manner in the absence of a solvent to form an intimate homogeneous mixture which I then sheet out, as on an ordinary rubber calender, into a film of the desired thickness. Typically the film ranges in thickness from 0.005 to 0.025" but it can be thicker than the stated upper limit, for example, ranging upwardly to as thick as 0.1" or to even greater thicknesses. The only limitation on thickness is that imposed by cost of the film.

In practicing the invention, I employ a phenol-formaldehyde resin which is soluble, fusible and thermo-setting, i. e. capable of cross-linking with formaldehyde or a hardening agent supplying formaldehyde, such as hexamethylenetetramine or paraformaldehyde, under the conditions of curing with conversion to insoluble, infusible state. The phenolic resin is almost invariable of the type known in the art as a "Novolak," prepared by the condensation of phenol and formaldehyde in the presence of an acid catalyst, the ratio of phenol to formaldehyde being such that the resin is fusible and soluble in polar solvents. The resin must be compatible with the butadiene-acrylonitrile rubbery copolymer component of the adhesive mixture. The resin should be soluble in the rubbery copolymer at least to the extent of 10% and preferably at least to the extent of 50%, these percentages being based on the weight of the rubbery copolymer, and the rubbery copolymer should exhibit a similar degree of solubility in the resin. Those skilled in the art can readily determine whether a given resin and a given rubbery copolymer have the necessary degree of mutual compatibility or solubility which can be readily judged by observing the degree of transparency of an uncured mixture of the resin and rubber alone.

The resin used can be a straight phenol-formaldehyde resin or it can be modified with a suitable modifying agent according to known practice. Thus, the resin can be based upon common tri-functional phenols, e. g. ordinary phenol. The tri-functional phenols are those which are free from substitution in the three positions ortho and para to the phenolic hydroxyl group. The resin can be modified by employing such a tri-functional phenol in conjunction with another phenol which can be tri-function, di-functional or monofunctional. For example, I can use a resin based upon ordinary phenol (carbolic acid) but modified or co-condensed with a lesser proportion of any of the following phenols, which may be either pure or mixed: the cresols, the xylenols, the tri-methylphenols, monochlorophenols, dichlorophenols, diamylphenols, diisopropylphenols, p-tertiary-butylphenol, p-phenylphenol, resorcinol, and hydroquinone. I especially prefer to employ a resin based upon ordinary phenol and the phenol which is obtained from cashew nut shell oil by heating whereby it is converted to the long-chain unsaturated phenol, m-(7-tetradecenyl) phenol, commonly known as cardanol. When a mixture of ordinary phenol and cardanol is reacted with formaldehyde in a manner well known to the art, there is produced a thermosetting, soluble, fusible, cashew nut shell oil-modified resin, which upon being heated with a minor proportion of hexamethylenetetramine, is converted to the insoluble, infusible state. The amount of the cashew nut shell oil phenol employed for modifying the resin preferably ranges from 3 to 12 mol percent based on the two phenols.

Any cashew nut shell oil-modified phenol-formaldehyde resin made by reacting cashew nut shell oil or its equivalent such as decarboxylated cashew nut shell oil and a lower molecular weight phenol with formaldehyde and which is capable of being advanced to the insoluble, infusible stage upon being subjected to the action of heat while in intimate admixture with a methylene-yielding hardening agent typified by hexamethylenetetramine can be employed in the practice of my invention. Such resins are available commercially, an example being that known in the trade as Durez No. 12686. The resin may be available commercially with the methylene-yielding hardening agent already admixed therewith, an example being the resin sold as Durez No. 12687 which is a mixture of 92–94 parts of Durez 12686 and 6–8 parts of hexamethylenetetramine.

Ordinary phenol is the preferred lower molecular weight phenol used in making the phenolic resin. As ordinary phenol is replaced by its homologs, e. g. cresol, there is a tendency for the resin obtained to become softer and to have poorer physical properties with corresponding effect upon the bond.

The resin is typically made by heating a mixture of the lower molecular weight phenol, the cashew nut shell oil (either as such or in the decarboxylated form) and formaldehyde, in the presence of a suitable catalyst, usually an inorganic acid, e. g. sulfuric or hydrochloric acid, until an oil-soluble resin is produced. During the final portion of the reaction, the resin is advanced to the desired stage at which it is still soluble and fusible but convertible to insoluble, infusible form by the combined action of heat and the hardening agent. Advancement of the resin to the desired state and removal of volatile materials are preferably accomplished by passing superheated steam through the charge until the residual mixture has reached a suitable elevated temperature, e. g. 150–225° C.

Any rubbery copolymer of butadiene and acrylonitrile which is compatible with the phenol-formaldehyde resin can be used. The rubbery butadiene-acrylonitrile copolymer will typically contain from 15 to 45% by weight of combined acrylonitrile. Those rubbery copolymers which contain from 35 to 45% acrylonitrile are particularly suitable because they are completely compatible or miscible in all proportions with the preferred cashew nut shell oil-modified phenolic resin.

The filler used in the mixture used to form the bond in accordance with my invention can be wood flour, silica such as sand or diatomaceous earth, carbon black, clay, asbestos fibers, or cellulose fibers. I especially prefer to employ diatomaceous earth as the filler. Any of the commercially available forms of granular or powdered diatomaceous earth can be used. Usually the diatomaceous earth has a relatively small particle size, generally being so fine that substantially all of it passes a 100 mesh sieve. Usually the particle size of this material will cover a range of from as large as 100 microns down to particles too small to be seen. I have obtained very satisfactory results using the diatomaceous earth known in the trade as "Dicalite 14W," also known as grade L–1, put out by The Dicalite Company.

The filler used in the practice of my invention preferably is of such small particle size that substantially all thereof passes a 100 mesh sieve.

The use of substantial amounts of the filler in the mixture is an essential feature of my invention since otherwise it would not be possible to sheet out the mixture of rubber and resin to form a film having the desired properties. In other words, the filler performs a definite function as a processing aid. Nevertheless, the presence of the filler does not impair the bonding and reinforcing action of the plastic sheet or film upon the wood assembly. It was surprising to find that the filler did not reduce the bonding or reinforcing effect of the sheet or film used as the adhesive in accordance with my invention.

The composition used in making the adhesive film or sheet of the present invention must also contain a methylene-yielding hardening agent capable of advancing the phenol-formaldehyde resin to the infusible, insoluble condition during the curing operation. Hexamethylenetetramine is by far the preferred material for this purpose since it is capable of giving off formaldehyde under the conditions of curing. However, any of the polymeric formaldehydes such as paraformaldehyde can be used as a hardening agent in place of hexamethylenetetramine. Usually the amount of the methylene-yielding hardening agent will range from 5 to 10% by weight based on the phenolic resin.

I prefer to employ the phenolic resin and the rubbery butadiene-acrylonitrile copolymer in relative proportions ranging from 30 to 70% by weight of the resin and correspondingly from 70 to 30% by weight of the rubbery copolymer, these percentages being based upon the sum of the weights of the resin and the rubbery copolymer. Proportions of resin within the lower part of the above range, e. g. from 30 to 50% by weight of the two components, are in many cases more suitable than higher proportions of resin because with the lower proportions the elasticity and stretchability of the film are substantially enhanced whereas the film may tend to get brittle as the amount of resin exceeds 50%.

The proportion of filler used in the mixture preferably ranges from 30 to 55% by weight based on the sum of phenolic resin and the rubbery copolymer.

The mixture used to form the film almost invariably consists essentially of the phenolic resin, butadiene-acrylonitrile rubbery copolymer and filler. However, it may also contain small amounts usually not more than 5% (based upon resin plus rubber) of other suitable materials such as lubricants, pigments and coloring agents, anti-oxidants for the rubber, etc. If desired, vulcanizing agents for the rubber, such as sulfur, and other vulcanizing ingredients such as the usual vulcanization accelerators, may also be present in amounts sufficient to cure the rubbery copolymer by itself to the soft vulcanized state. However, the use of vulcanizing agents and the like for the rubbery copolymer is not necessary and as a matter of fact it is believed that slightly better results are obtained when they are omitted.

The phenolic resin, hardening agent, rubbery copolymer and filler are commingled in any suitable manner, as by milling on a rubber mill or in a Banbury mixer, to form a uniform homogeneous mixture. This mixture is then sheeted out, typically on a rubber calender, to form a sheet of the desired thickness. The thin dry sheet is then cut into sheets of suitable size for insertion between the layers of wood to be laminated.

The layers of wood are plied up with a sheet of the dry adhesive between each pair of adjacent wood faces. The resulting assembly is then subjected to heat and pressure to effect simultaneous curing of the rubbery copolymer-phenolic resin mixture with advancement of the phenolic resin component to the insoluble, infusible stage and lamination of the layers of wood into a strong structure. Under the action of the heat and pressure applied during the curing and bonding operation, the plastic material of the sheet flows in such a way as to form a very strong bond with the wood and to conform in an unusually accurate manner with the faces of the wood. A very important advantage of the invention is that the faces of the wood layers to be joined do not need to be so accurately or smoothly finished preparatory to bonding as is the case when using conventional wood adhesives. With conventional adhesives, optimum bond strength is obtained when the adjacent faces of the wood plies are finished so that deviations from planar therein do not exceed 0.005" in depth. However, by using the sheet adhesive of the present invention as the bonding agent, errors in the wood as great as 0.25" in depth are tolerated without diminution in strength of bond. Thus less carefully prepared wood plies, such as those having rough-sawed faces can be used with marked saving in cost of manufacture.

In the curing and laminating operation, I can employ relatively low pressures, e. g. of the order of 40 to 125 pounds per square inch. I generally employ curing temperatures ranging from 250° to 300° F. These pressures and temperatures can easily be attained by well-known techniques readily available to the laminator.

The assembly is exposed to the curing conditions until the resin component is substantially completely converted to the insoluble, infusible condition. Actually, the resin and the rubbery copolymer exert a mutual co-curing action, the resin serving to cure the rubber even though the conventional vulcanizing ingredients are omitted from the mixture.

After curing is complete, I prefer to maintain the pressure until the assembly has cooled down to at least 200° F. and preferably down to 150° F. or lower. Attention is directed to the fact that with the present invention it is possible to use low assembly pressures with the result that injury to the wood which would occur with high pressures is avoided, nevertheless good bonding of the plastic layers to the wood face is obtained with the relatively low pressures of the invention.

In the accompanying drawing, Fig. 1 shows two layers 1 of wood to be joined with a film 2 in accordance with the present invention, and Fig. 2 shows the resulting assembly after curing in the manner described above.

Fig. 3 portrays in elevation, the apparatus used in determining the strength of the bond in the example below. This apparatus was used because it determines the strength of the entire assembly, i. e., adhesive and wood, and not merely the strength of the wood or adhesive alone. It does this by measuring the force required to separate a parallel grain laminate along the grain line. In Fig. 3, a test sheet 3 of parallel grain laminate is employed. An opening 4 which is slightly larger than semi-circular is cut in one edge of the laminate 3. Opening 4 is so positioned that it has one diameter at right angles to the grain of the plies in laminate 3. Test piece 3 is positioned as shown with two opposing rigid members 5 projecting into opening 4 and having upwardly and downwardly extending portions 6 contacting piece 3 at opposite ends of the diameter disposed at right angles to the grain of the wood in the plies. The arrangement is such that members 5 contact the test piece 3 only at the terminal portions 6. Members 5 are integrally connected to other angular rigid members 7. After the test piece is in position, members 5 are pulled away from each other by exerting a pulling force by means of bolts 8 which are connected to the separating jaws of any suitable type of machine (not shown). The separating force in pounds required to break the wood can easily be measured in this way. The test conditions described are similar to those of the ASTM D143–49 test for "Cleavage."

An unusual aspect of wood laminated with parallel grain plies by means of the present invention is that even if the individual plies of the wood be separated along the lines of the grain, as in the test just described, the adhesive layer is not broken because it is elastic, with the result that upon release of the separating force, the pieces of wood are pulled back together so that the laminated wood article can be continued in use.

*Example*

All tests described in this example were conducted with knife-cut bay poplar veneer sheets of 0.132" gauge. These sheets were carefully selected for clear grain and uniformity. They were stored at 50% relative humidity at 70° F. for three weeks prior to use.

The adhesive used in all tests had the following formulation:

| Ingredient | Parts by weight |
| --- | --- |
| Butadiene-acrylonitrile rubbery copolymer ("Hycar OR-15") | 41.67 |
| Cashew nut shell oil-modified phenol-formaldehyde resin ("Durez No. 12687") | 26.96 |
| Diatomaceous earth ("Dicalite L-1") | 29.41 |
| Rubber anti-oxidant ("Age Rite White") | 0.49 |
| Carnauba wax | 0.98 |
| Lubricant ("Migraluble") | 0.49 |

These ingredients were intimately commingled to a homogeneous mixture on an ordinary rubber mill. The resulting mixture was sheeted on a calender into a sheet 0.010" in thickness. Two layers of the wood veneer were then plied up with a sheet of this mixture therebetween and with the grain of the two layers running in a single direction. The assembly was cured at about 300° F. and 50 lbs. per square inch pressure. The resulting assembly was then tested for cleavage in the manner portrayed in Fig. 3. A separating force of 80.7 pounds (average of several experiments) was required to crack the wood of the laminate. The crack in the wood was clean and upon removal of the separating force the crack closed due to the elastic nature of the adhesive bond.

Identical experiments were conducted except that in place of the dry sheet adhesive, there was employed a solvent-based cement of this adhesive prepared by dissolving the rubber and resin in and commingling the other ingredients with 50 percent (by weight based on all ingredients) of acetone as a solvent. The faces of the wood layers were coated with relatively smooth even films of this cement and were then plied up, allowed to stand to effect evaporation of solvent insofar as possible and then cured under the same conditions as before. The resulting laminates were then tested in the same manner as before. It was found that an average of only 62 pounds was required to effect the break in the wood plies along the line of the grain. Moreover the break was not clean and upon removal of the separating force the wood did not move together so as to close the crack in the same advantageous way as with the dry sheet adhesive.

It will be seen that the strength of the bond obtained with the dry sheet the components of which were never dissolved in a solvent was markedly higher than the strength of a corresponding laminate made with the same adhesive material made in the form of a cement with the resin and rubber dissolved in a volatile organic solvent. Cleavage tests upon two layers of the wood alone disposed with the grain parallel but without any adhesive showed that a force of 50.3 pounds on the average was required to break the wood along the line of the grain. The cleavage test method was identical with that described above.

The practice of my invention presents numerous advantages over previous practice. The practice of the invention produces an extremely strong bond which is actually stronger than the wood. Moreover the adhesive sheet of the present invention serves as a substitute for one ply of wood. The invention enables one to obtain control in grain directional stiffness without the accompanying grain directional splitting commonly encountered with this type of construction. My invention makes it unnecessary to dispose alternate layers of wood in cross-grain fashion as is commonly required to get homogeneous strength characteristics. It is extremely advantageous to be able to assemble the wood layers with their grain running in a single direction and yet to be able to get a product which is substantially as strong as it would be if the layers of wood were arranged with the grain of alternate layers arranged at right angles to one another as is conventional practice in the wood laminating art. The ability to arrange the wood plies uni-directionally without serious impairment of strength is an important advantage particularly to cabinet and furniture makers because it obviates the need of covering up the unsightly edge of conventional plywood. Another advantage is that the invention dispenses with the use of solvent- or water-based cements and avoids penetration of the wood by the solvent or water vehicle. The invention obviates the necessity of removing a volatile organic solvent or water from the laminate. Removal of such a solvent or water from the interior of a laminate is at best difficult and requires provision of means for physically removing the vapor after it has reached the exterior of the laminate. Practically, it is impossible to effect complete removal of solvent or water from the laminate. My adhesive presents no water which would seriously interfere with the use of dielectric heating methods. The invention permits clean assembly without the "messiness" encountered with the usual adhesive cements. The bond obtained by the present invention is not affected by the presence of wood dust which is prevalent in wood laminating factories and which adversely affects the behavior of water- and solvent-based adhesives. The adhesive film of my invention is easily prepared using ordinary rubber manufacturing equipment. The sheeting of the mixture is simple and involves no tedious coating operation. The film of my invention is flexible and strong in contrast to the fragile nature of resin-impregnated paper-based adhesive sheets or sheets of resin of paper thinness. In addition my film is free from paper with its added cost and potential weakening effect. Also the film of the invention is stretchable permitting easy assembly of compound curves. My invention enables a strong bond to be produced without the necessity of smoothly finishing the faces of the wood layers to be joined. By completely dispensing with the use of an organic solvent or a liquid medium of any kind, both in the production of the bonding sheet and in the production of the laminated assembly, I obtained marked advantages of simplicity, ease of handling, etc., and at the same time avoid the expense, toxicity and fire hazard attendant upon the use of volatile organic solvents. In addition, as is shown by the above example, my dry sheet adhesive, the rubber and resin components of which have never been dissolved in organic solvents, exerts a much better bonding action upon the wood than a similar adhesive based upon an organic solvent. Numerous other advantages of my invention will be obvious to those skilled in the art.

Having thus described my invention, what I claim and desire to protect by Letters Patent is:

1. A new article of manufacture comprising a plurality of layers of wood bonded together by a layer at least 0.005" thick of a heat cured homogeneous solvent-free mixture consisting essentially of a soluble fusible cashew nut shell oil-modified lower molecular weight phenol-formaldehyde resin, said resin being capable of being converted to insoluble, infusible form under the action of heat and a methylene-yielding hardening agent, a methylene-yielding hardening agent for said resin, a rubbery butadiene-acrylonitrile copolymer which is compatible with said resin, said resin and said copolymer never having been dissolved in a solvent, and diatomaceous earth, said resin and said copolymer being present in proportions of from 30 to 50% by weight of said resin and correspondingly from 70 to 50% by weight of said copolymer, said percentages being based on the sum of said resin and said copolymer, and said diatomaceous earth being present in a proportion of from 30 to 55% by weight based on the sum of said resin and said copolymer.

2. A new article of manufacture comprising a plurality of layers of wood all of which are disposed with their grain parallel and bonded together by a layer at least 0.005" thick of a heat-cured homogeneous solvent-free mixture consisting essentially of a soluble fusible cashew nut shell oil-modified lower molecular weight phenol-formaldehyde resin, said resin being capable of being converted to insoluble infusible form under the action of heat and a methylene-yielding hardening agent, a methylene-yielding hardening agent for said resin, a rubbery butadiene-acrylonitrile copolymer which is compatible with said resin, said resin and said copolymer never having been dissolved in a solvent, and diatomaceous earth, said resin and said copolymer being present in proportions of from 30 to 50% by weight of said resin and correspondingly from 70 to 50% by weight of said copolymer, said percentages being based on the sum of said resin and said copolymer, and said diatomaceous earth being present in a proportion of from 30 to 55% by weight based on the sum of said resin and said copolymer.

3. A method of bonding layers of wood together which comprises plying up a plurality of layers of wood with a solvent-free film at least 0.005" thick of a mixture consisting essentially of a soluble fusible cashew nut shell oil-modified lower molecular weight phenol-formaldehyde resin, said resin being capable of being converted to insoluble infusible form under the action of heat and a methylene-yielding hardening agent for said resin, a rubbery butadiene-acrylonitrile copolymer which is compatible with said resin, said resin and said copolymer never having been dissolved in a solvent, and diatomaceous earth, said resin and said copolymer being present in proportions of from 30 to 50% by weight of said resin and correspondingly from 70 to 50% by weight of said copolymer, said percentages being based on the sum of said resin and said copolymer, and said diatomaceous earth being present in a proportion of from 30 to 55% by weight based on the sum of said resin and said copolymer, between each pair of wood layers, and subjecting the assembly to heat and pressure to cure said film.

4. A method of bonding layers of wood together which comprises plying up a plurality of layers of wood all of which are disposed with their grain running in a single direction with a solvent-free film at least 0.005" thick of a mixture consisting essentially of a soluble fusible cashew nut shell oil-modified lower molecular weight phenol-formaldehyde resin, said resin being capable of being converted to insoluble, infusible form under the action of heat and a methylene-yielding hardening agent, a methylene-yielding hardening agent for said resin, a rubbery butadiene-acrylonitrile copolymer which is compatible with said resin, said resin and said copolymer never having been dissolved in a solvent, and diatomaceous earth, said resin and said copolymer being present in proportions of from 30 to 50% by weight of said resin and correspondingly from 70 to 50% by weight of said copolymer, said percentages being based on the sum of said resin and said copolymer, and said diatomaceous earth being present in a proportion of from 30 to 55% by weight based on the sum of said resin and said copolymer, between each pair of wood layers, and subjecting the assembly to heat and pressure to cure said film.

References Cited in the file of this patent

UNITED STATES PATENTS

| Re. 16,058 | Jordan | Apr. 28, 1925 |
|---|---|---|
| 1,336,262 | Sponsler et al. | Apr. 6, 1920 |
| 2,290,548 | Galber | July 21, 1942 |
| 2,376,854 | Saunders et al. | May 22, 1945 |
| 2,459,739 | Groten et al. | Jan. 18, 1949 |
| 2,532,374 | Shepard et al. | Dec. 5, 1950 |
| 2,560,033 | Nanfeldt | July 10, 1951 |
| 2,581,926 | Groten et al. | Jan. 8, 1952 |
| 2,605,248 | Fisk | July 29, 1952 |
| 2,630,395 | McCullough et al. | Mar. 3, 1953 |

OTHER REFERENCES

Fillers for Plastics, by E. E. Halls in British Plastics for October 1942, pp. 352-354.